Sept. 1, 1936.　　　　G. W. SCHILLING　　　　2,052,848
PUZZLE GAME
Filed Aug. 10, 1934　　　　3 Sheets-Sheet 1
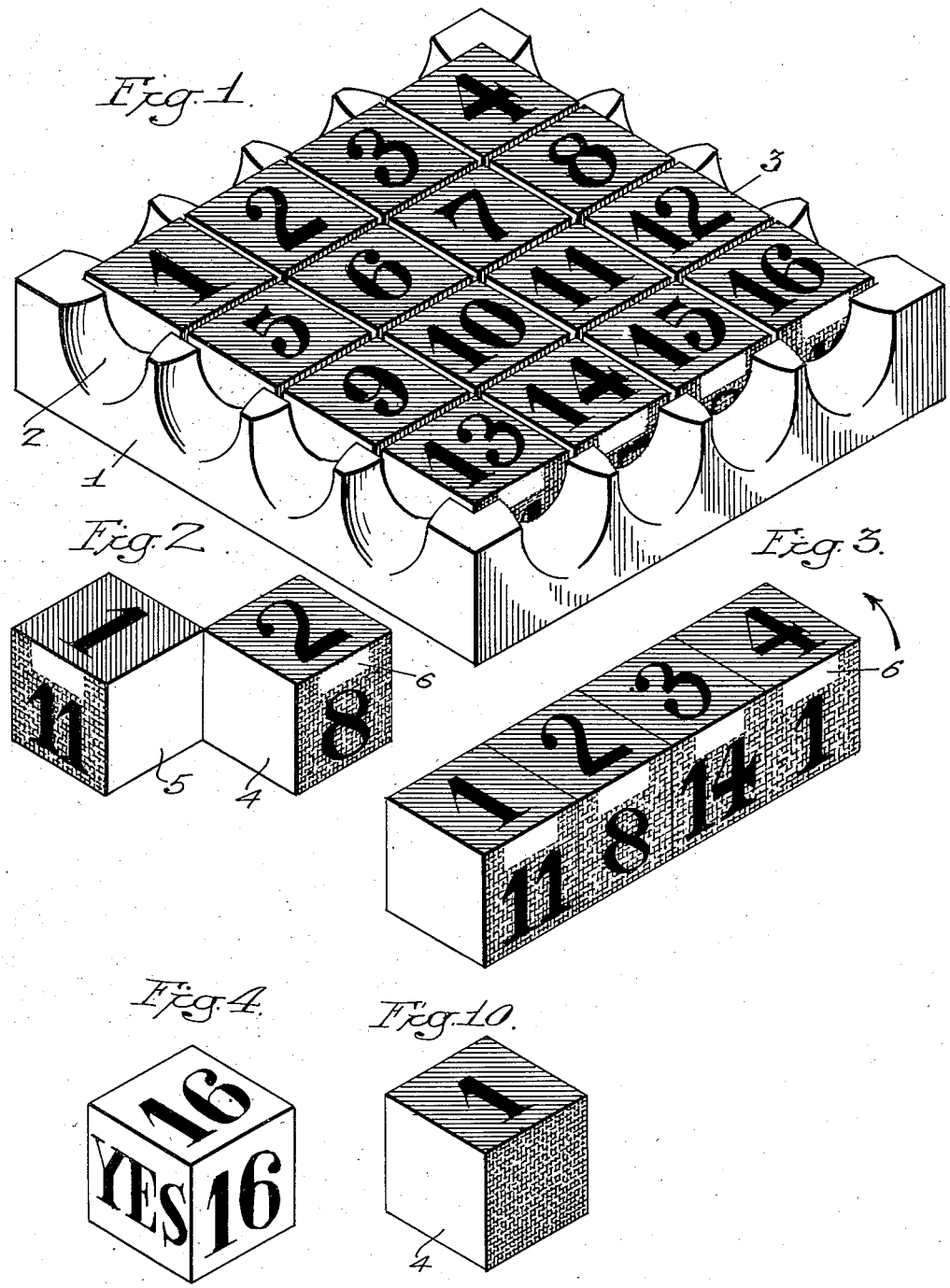

Sept. 1, 1936.  G. W. SCHILLING  2,052,848
PUZZLE GAME
Filed Aug. 10, 1934   3 Sheets-Sheet 2

Fig. 5.

| 7 | 14 | 4 | 9 |
| 12 | 1 | 15 | 6 |
| 13 | 8 | 10 | 3 |
| 2 | 11 | 5 | 16 |

Fig. 6.

| 11 | 8 | 14 | 1 |
| 13 | 2 | 12 | 7 |
| 4 | 15 | 5 | 10 |
| 6 | 9 | 3 | 16 |

Fig. 7

| 6 | 7 | 12 | 9 |
| 10 | 11 | 8 | 5 |
| 15 | 14 | 1 | 4 |
| 3 | 2 | 13 | 16 |

Fig. 8.

| 6 | 12 | 15 | 1 |
| 13 | 3 | 8 | 10 |
| 4 | 14 | 9 | 7 |
| 11 | 5 | 2 | 16 |

Inventor:
George W. Schilling
by his Attorneys
Howson & Howson

Sept. 1, 1936.  G. W. SCHILLING  2,052,848
PUZZLE GAME
Filed Aug. 10, 1934  3 Sheets-Sheet 3

Inventor
George W. Schilling
by his Attorneys
Howson & Howson

Patented Sept. 1, 1936

2,052,848

UNITED STATES PATENT OFFICE 2,052,848

PUZZLE GAME

George W. Schilling, Philadelphia, Pa.

Application August 10, 1934, Serial No. 739,325

2 Claims. (Cl. 273—132)

This invention relates to amusement apparatus in the form of a puzzle or game comprising cubicle blocks with indicia thereon disposed in a supporting tray or container and movable therein upon the removal of a single block. The principal object of the invention is to provide an improved and novel device of this general nature.

Another object of the invention is to provide a puzzle or game of this class which provides successive workable puzzles and magic squares constituting a "round trip" puzzle, this term being chosen as an appropriate one, and in which the number of workable puzzles and magic squares may be multiplied by shifting the blocks in certain manners.

A further object of the invention is to provide a puzzle or game of this nature in which blank spaces are provided on the blocks for the inscription of indicia, and a chart is furnished containing selectable workable combinations constituting magic squares so that additional workable puzzles and magic squares may be provided on the blocks and there may be provided a second "round trip" puzzle.

These and other objects will be more clearly apparent from the following description in connection with the accompanying drawings.

In the drawings:

Fig. 1 is a perspective view of the blocks in their supporting tray;

Fig. 2 in a perspective view showing two of the blocks in a manner to illustrate more clearly the construction and marking of the blocks;

Fig. 3 is a perspective view showing a group or row of blocks in order to illustrate a feature which will be explained hereinafter;

Fig. 4 is a perspective view of one of the blocks illustrating a certain feature of the device;

Figs. 5 to 8 are face views of the blocks with different marked faces thereof exposed to illustrate a further feature of the device which will be presently explained;

Fig. 9 shows various workable combinations and magic squares which are usable in connection with the blocks as will be explained hereinafter; and Fig. 10 is a perspective view of a modified form of block usable in a simplified embodiment of the device.

Referring to Fig. 1, there is shown a shallow supporting tray 1 having recesses 2 formed in its sides to facilitate movement of the blocks in the contemplated manner. The blocks 3 are sixteen in number in the present instance and they are of such size in relation to the tray that they are snugly contained in the tray in the form of a square. It will be understood, of course, that the invention is not limited to any particular number of blocks nor to any specific size of the blocks and supporting tray.

Each of the blocks has opposed blank faces 4 and 5, as shown more clearly in Fig. 2. In order to distinguish the various faces of the blocks, we may designate the blank faces 4 and 5 as "side" faces, the face 4 being the left side face, while the face 5 is the right side face. Then we may designate the remaining faces of the blocks as "front", "black", "top", and "bottom" faces, as will be clear from inspection. These other faces of the blocks are distinctively colored. For the purpose of illustration, we shall assume that the colors employed are green, yellow, blue and white, respectively. The faces of the blocks which are thus colored, i. e. the green faces, the yellow faces, etc., have marked thereon consecutively arrangeable indicia which may take the form of numbers from 1 to 16 as illustrated. Thus, with the green faces exposed, for example, the blocks may be arranged in consecutive order.

In the playing of the game or puzzle, the blocks are successively manipulated with the differently colored faces exposed. When the blocks are to be moved to change from one exposed face to another, they may be rotated in groups or rows about parallel axes through the opposed blank faces of the blocks. Such a row of blocks is shown in Fig. 3. It will be clear from Fig. 1 that different marked faces of the blocks may be exposed by rotating the row of Fig. 3 and then successively rotating the other parallel rows of blocks. This rotation of each successive row is readily accomplished by merely placing a finger of each hand in the recesses of the tray side walls and against the outer side faces of the two outermost blocks. In this manner, the row of blocks may be lifted as a unit from the tray and then rotated and placed back in the tray in proper position. In the contemplated manner of playing the game, the rows of blocks are rotated in the direction of the arrow in Fig. 3. The exposed or top face of the blocks, shown in Figs. 1 and 3, is colored green, while the remaining marked faces in the order that they are exposed by rotation in the direction of the arrow are colored yellow, blue and white, respectively. The indicia on the faces of the blocks with respect to the various colors as illustrated herein is in accordance with the following schedule, although it will be understood that such arrangement is not essential but may be modified, provided certain characteristics hereinafter set forth are maintained.

| Green | Yellow | Blue | White |
|-------|--------|------|-------|
| 1 | 11 | 1 | 6 |
| 2 | 8 | 5 | 13 |
| 3 | 14 | 2 | 12 |
| 4 | 1 | 6 | 3 |
| 5 | 13 | 3 | 15 |
| 6 | 2 | 7 | 8 |
| 7 | 12 | 4 | 1 |
| 8 | 7 | 8 | 10 |
| 9 | 4 | 9 | 4 |
| 10 | 15 | 13 | 11 |
| 11 | 5 | 10 | 14 |
| 12 | 10 | 14 | 5 |
| 13 | 6 | 11 | 9 |
| 14 | 9 | 15 | 2 |
| 15 | 3 | 12 | 7 |
| 16 | 16 | 16 | 16 |

With any one of the marked faces of the blocks exposed and with the blocks arranged indiscriminately, they may or may not be arranged in a workable combination or in a magic square. By a "workable combination", I mean such an arrangement of the blocks as will permit the successful working of the well-known "15" puzzle. In this puzzle, the last block, (in this case the 16 block) is removed and the other blocks are moved in the tray until they are arranged in sequence, as shown in Fig. 1. It is characteristic of the arrangement of indicia indicated by the above schedule that when the indicia on any one face are numerically arranged in sequence, the indicia on each of the other faces are arranged in a workable combination. The term "magic square" is generally understood, but it might be well to explain that such a square is one composed of numbered blocks which are arranged so that any and all of the rows or columns of blocks, as well as the blocks which are aligned across the diagonals of the square, add up to a certain number. In the present instance, magic squares adding up to the number 34 are employed, but it will be understood that the invention is not limited thereto.

With this explanation, I may proceed with the description of the game or puzzle contemplated herein. It will be noted from the drawings and the above schedule that one of the blocks contains the last of the indicia, which is 16 in the present instance, on all four of its marked faces. On each of the other blocks, the numbers on the marked faces are different. This marking of the single block in question is very important and is the key to the puzzle as will be more clearly understood hereinafter. It may also be noted at this time that the block in question with the number 16 on all its marked faces contains the words "yes" and "no" on the side faces corresponding to the blank faces of the other blocks. The reason for so marking the side faces of this block is that the position of this block in any instance when the blocks are shifted to change their order, as will be explained presently, determines whether or not the puzzle will work out properly. Therefore, in any particular instance, one may determine in his mind from the position of the 16 block whether the puzzle will work out properly and then when the block is removed from the tray, it may be placed with either of the words "yes" or "no" exposed. This serves as a sort of check on the manipulations of the blocks to obtain different and varied puzzles.

Suppose I now start with the green faces of the blocks exposed and with the blocks arranged in numerical sequence as illustrated in Fig. 1. The blocks are now rotated a quarter turn to expose the yellow faces, as shown in Fig. 6. The numbers on the yellow faces will be arranged as in Fig. 6. It will be noted that there is thus turned up a magic square in which all of the rows and columns, as well as the diagonals, add up to 34, this magic square having been produced automatically by simply turning the blocks.

With the yellow face exposed, as in Fig. 6, the "15" puzzle is worked and the blocks thus placed in numerical sequence. Following this, the blocks are again rotated a quarter turn to expose the blue face as shown in Fig. 7. At this time, a second magic square of the same type is produced. The "15" puzzle is again worked with the blue faces exposed and the blocks are then rotated another quarter turn to expose the white faces as shown in Fig. 8. It will be seen that a third and similar magic square is thus produced. The "15" puzzle is again worked and the blocks rotated another quarter turn to again bring up the green faces. It will be found that the blocks will be arranged in a fourth magic square as in Fig. 5. The "15" puzzle is now worked to place the blocks as they were originally, making a "round trip" puzzle. Thus, there is produced by the predetermined markings of the blocks, successive workable combinations and magic squares. It will be noted that in all four of the magic squares which are thus produced, the number 16 is at the lower right-hand corner, this resulting from the marking of that particular block as above mentioned which is essential to the accomplishment of the purpose in view. It is important to note also that only four faces of the blocks may contain indicia and the rotation of the blocks must always be in the direction specified. These are important features which are essential to the game or puzzle.

Each of the four magic squares produced as above described will make three more magic squares by shifting the outermost columns or rows to bring about a different arrangement of the blocks. Many different magic squares can be obtained in this manner but only some of them will work out successfully as the "15" puzzle. It is an amusing and peculiar fact that the position of the 16 block determines whether or not any particular combination or magic square will work out successfully as the "15" puzzle. If the 16 block lies in such position that it requires an even number of moves of rows and/or columns to bring it into the lower right-hand corner, then the combination or magic square will work out successfully as the "15" puzzle. If, on the other hand, the 16 block lies in such position as to require an odd number of moves of rows and/or columns to bring it into the lower right-hand corner, then the combination or magic square will not work out successfully as the "15" puzzle. Thus in addition to the amusement afforded by working the different puzzles and provide additional magic squares and puzzles, there is the very interesting and peculiar feature incident to the location of the 16 block. Quite obviously, if the user does not known the key to the foretelling of the workability of any particular combination or magic square, many hours of diversion may be spent in endeavoring to foretell the workability of many different combinations or magic squares. As stated above, the words "yes" and "no" on the 16 block are to enable the user to indicate beforehand whether it is his guess or opinion that the puzzle will work out.

Another important feature is that when the numbers on the faces of one color are consecutively arranged, the numbers on each of the other faces are arranged in a workable combination so that successive workable puzzles are available by turning up the various faces in any order.

Another important feature of the game or puzzle will now be described. It will be noted that on all of the colored faces of the blocks, excepting the green faces, there are provided blank spaces 6 within which indicia may be marked and erased. Preferably, these portions of the block surfaces will be adapted for the ready inscription of indicia and the removal thereof by having such portions suitably surfaced as by a coating which will readily receive pencil markings and from which such markings may be easily erased. In Fig. 9, there is shown a substantial number of magic squares designated 7 to 27 respectively, which are similar to those above described. The combinations or arrangements of numbers in the squares shown in Fig. 9 are workable combinations, that is, they may be worked as the "15" puzzle. Workable combinations and magic squares, such as those of Fig. 9, may be furnished with the game or puzzle and are adapted to be used in conjunction therewith as follows.

With the green faces of the blocks exposed and arranged as shown in Fig. 1, the blocks are rotated in rows through a quarter revolution or turn to bring up the yellow faces, as shown in Fig. 6. Any one of the combinations or magic squares shown in Fig. 9 may be chosen and the numbers marked in proper order in the blank spaces of the blocks shown in Fig. 6. The "15" puzzle is then worked, using the inscribed numbers instead of the permanent numbers. Following this, the blocks are rotated to bring up the blue faces, as in Fig. 7, and again a combination or magic square is chosen from those of Fig. 9 and the numbers thereof incribed in the blank faces shown in Fig. 7.

The "15" puzzle is again worked, using the inscribed numbers, and the blocks are turned to bring up the white faces, as in Fig. 8. Again, one of the combinations or magic squares of Fig. 9 is selected and inscribed in the blank spaces and the "15" puzzle is again worked, using the inscribed numbers. The blocks are then rotated to bring up the green faces. The numbers on the green faces of the blocks will be indiscriminately arranged and if it is found that they form a magic square, then the puzzle has been successfully worked. I have found that there are very few combinations which will give this successful result and this phase of the game therefore comprises a very interesting and amusing one. If the numbers on the green faces are not in the form of a magic square, as will usually be the case, then it is necessary for the person playing the game to either erase all of the inscribed indicia and repeat the playing with a different combination of magic squares chosen, for example, from Fig. 9 or else turn the blocks so as to expose the blue faces, work the "15" puzzle, turn up the white faces, and then inscribe a different combination of numbers on the blank spaces of the white faces in an endeavor to turn up on the green faces a magic square. This is a second "round trip" puzzle.

It will be seen from the above description that there are various interesting and amusing features embodied in the game or puzzle which will afford much interesting diversion to a person using the device simply as a puzzle or to several persons using it as a competitive game. When used as a game, any suitable rules may be devised and used. For example, the number of moves required in the working of each successive "15" puzzle may be counted as scoring points and in the "round trip" puzzle, the number of tries to complete the puzzle may also be counted as points.

A simplified embodiment involving the second "round trip" puzzle only might be provided by having blocks such as that illustrated in Fig. 10 in which only one face, such as the green face, is marked. The other three faces to be used will be distinctively colored but will be blank and susceptible to inscribing indicia thereon taken from those of Fig. 9. The 16 block, however, will remain as before. The manner of using such a set of blocks to work the "round trip" puzzle will be the same as above described. While this embodiment provides a very interesting and amusing puzzle or game, it does not provide the additional interesting and amusing features of the preferred embodiment.

Although there is illustrated and described herein certain forms of the game or puzzle, it will be obvious that various modifications and changes may be made without departing from the spirit and scope of the invention.

I claim:

1. A moving block puzzle, comprising a supporting tray; a plurality of removable cubical blocks arranged in rows within said tray; said blocks having two opposed blank side faces, the other faces of said blocks being distinctively colored and having indicia thereon, one only of said blocks having the same indice on all of its said colored faces; said blocks being arrangeable, with a similarly colored face exposed, to bring the indicia thereon into consecutive arrangement by the removal of said one block and the movement of the remaining blocks within said tray; said blocks being rotatable in rows about parallel axes through their opposed blank side faces to expose another similarly colored face of the blocks; the indicia on said other similarly colored exposed face, when the blocks are rotated after arrangement as aforesaid, being non-consecutively arranged in a workable combination constituting a magic square; successive magic squares and workable puzzles being exposed by alternately arranging the blocks and rotating them after each arrangement, as aforesaid.

2. A moving block puzzle, comprising a supporting tray; a plurality of removable cubical blocks arranged in rows within said tray; said blocks having two opposed blank side faces, the other faces of said blocks being distinctively colored and having indicia thereon, one only of said blocks having the same indice on all of its said colored faces, and all except one of said colored faces having blank spaces for the inscription of indicia, whereby workable combinations constituting magic squares may be selected and inscribed in said blank spaces; said blocks being arrangeable, with a similarly colored face exposed, to being either the permanent indicia or the inscribed indicia thereon into consecutive arrangement by the removal of said one block and the movement of the remaining blocks within said tray; said blocks being rotatable in rows about parallel axes through their opposed blank side faces to expose another similarly colored face of the blocks; the permanent indicia on said other similarly colored exposed face, when the blocks are rotated after arrangement of the permanent indicia as aforesaid, being non-consecutively arranged in a workable combination constituting a magic square; successive magic squares and workable puzzles being exposed by alternately arranging the blocks and rotating them after each arrangement, as aforesaid.

GEORGE W. SCHILLING.